United States Patent
da Rosa

(10) Patent No.: US 10,219,498 B2
(45) Date of Patent: Mar. 5, 2019

(54) REEL WITH DISENGAGEABLE SEAL

(71) Applicant: Pure Fishing, Inc., Columbia, SC (US)

(72) Inventor: Joaquim da Rosa, Lexington, SC (US)

(73) Assignee: Pure Fishing, Inc., Spirit Lake, IA (US)

( * ) Notice: Subject to any disclaimer, the term of this patent is extended or adjusted under 35 U.S.C. 154(b) by 250 days.

(21) Appl. No.: 15/250,201

(22) Filed: Aug. 29, 2016

(65) Prior Publication Data

US 2018/0055025 A1 Mar. 1, 2018

(51) Int. Cl.
*A01K 89/01* (2006.01)
*A01K 89/00* (2006.01)
*A01K 89/015* (2006.01)

(52) U.S. Cl.
CPC .......... *A01K 89/004* (2015.05); *A01K 89/006* (2013.01); *A01K 89/0183* (2015.05); *A01K 89/011221* (2015.05)

(58) Field of Classification Search
CPC ............ A01K 89/004; A01K 89/01928; A01K 89/0193; A01K 89/0183
See application file for complete search history.

(56) References Cited

U.S. PATENT DOCUMENTS

| | | |
|---|---|---|
| 5,244,166 A | 9/1993 | Oi |
| 5,381,979 A | 1/1995 | Furomoto |
| 6,102,315 A | 8/2000 | Sato |
| 6,176,446 B1 | 1/2001 | Sato |
| 6,626,385 B1 | 9/2003 | Tsutsumi |
| 6,712,301 B2 | 3/2004 | Morise |
| 6,874,719 B2 | 4/2005 | Ikuta |
| 7,070,137 B2 | 7/2006 | Nishikawa et al. |
| 7,163,168 B2 | 1/2007 | Matsuo et al. |
| 7,537,178 B2 | 5/2009 | Saito |
| 7,614,577 B2 | 11/2009 | Ochiai et al. |
| 7,628,348 B2 | 12/2009 | Saito |
| 2002/0023980 A1* | 2/2002 | Matsuda ................ A01K 89/00 242/319 |
| 2002/0096587 A1* | 7/2002 | Ikuta ...................... A01K 89/00 242/319 |
| 2003/0047633 A1* | 3/2003 | Kitajima ............ A01K 89/0114 242/278 |
| 2014/0346265 A1 | 11/2014 | Ohara et al. |
| 2015/0115087 A1* | 4/2015 | Ohara ................. F16C 32/0406 242/223 |

FOREIGN PATENT DOCUMENTS

| | | |
|---|---|---|
| EP | 0986953 A1 | 3/2000 |
| JP | 2001231414 | 8/2001 |
| JP | 2002-345367 A | 12/2003 |
| JP | 2009261368 | 11/2009 |
| JP | 2009291212 | 12/2009 |
| JP | 2011-092124 A | 5/2011 |
| JP | 2011-135847 A | 7/2011 |
| JP | 2016-021884 A | 2/2016 |

* cited by examiner

*Primary Examiner* — Emmanuel M Marcelo
(74) *Attorney, Agent, or Firm* — Husch Blackwell LLP

(57) ABSTRACT

Spinning reels for left or right-handed use have reduced internal friction by a selectively disengageable seal at the unused connection port.

20 Claims, 3 Drawing Sheets

REEL WITH DISENGAGEABLE SEAL

FIELD OF THE INVENTION

The invention relates to a disengageable, internal seal for a fishing reel that reduces the friction on the handle mechanism during use.

BACKGROUND OF THE INVENTION

A spinning reel, also referred to as a single-bearing reel, generally includes a reel unit having a handle assembly, an axially displaceable spool, a rotor that is rotatively supported on the reel unit and which winds the fishing line around the spool as the spool axially cycles, and internal rotation transmission gear assembly that transmits the rotation of the handle assembly to the rotor. A bearing assembly supports the drive shaft of the rotor and is sealed to prevent the incursion of fouling and corroding agents. See U.S. Pat. No. 8,844,856 for a discussion of elastomeric seals around the bearing support of the spool shaft.

The rotation transmission assembly generally includes a master gear, a master gear shaft that is provided on the master gear, and a pinion gear that meshes with the master gear. The rotor is connected to the front portion of the pinion gear. A handle assembly is inserted into the reel and into engagement with the master gear to accommodate either right or left-handed anglers. See U.S. Pat. No. 5,244,166 and US Publication 2007/0278335.

The handle assembly includes a handle shaft, a handle arm that extends from the handle shaft in the radial direction, and a handle grip that is mounted to the tip of the handle arm. The handle assembly may, for example, include an internal or external threaded connection that mates with an exterior or interior threaded receiver on the reel body. The handle assembly will typically also include a rotatable drive shaft with a threaded (see, e.g., U.S. Pat. Nos. 6,102,315 and 6,626,385) or non-round terminal end that fits into a mating connection of the master gear shaft. Bearings are used on either side of the master gear extension members to provide a smooth, low friction, rotation of the master gear shaft. A second set of bearings for left and right sides of the reel are supported on abutments on each side of the reel body to provide a smooth, wobble-free rotational motion to the inserted handle. A watertight cap is used over the unused connection port to seal the interior of the reel and prevent fouling or corrosion of the gears and bearings.

Preventing water intrusion between nonmoving components is relative more simple than with moving components. Typically, rubber seal sandwiched between two mating surfaces tighten with bolts or screws will be sufficient. But sealing moving components is much more complicated, especially the seal is also required to be low friction. In essence, in a fishing reel there are multiple moving components, and multiple seals are required. Since each seal contribute friction, by eliminating or disengaging the seals when not in used will reduce the friction which allows the reel to spin freer.

Some type of seal is typically used on each of the lateral connection ports. These seals provide important protection of the gears against intrusion of water, sand, salt, and other contaminants while also allowing the handle to turn the master gear and operate the reel. Some type of seal is also used with the unused connection port. A sealing effect is accomplished by a frictional contact with both the handle and/or any extended portion of the master gear to which the handle connects.

Shaped sealing elements have been used around the spindle shaft of the handle assembly that is inserted into the reel. See U.S. Pat. Nos. 6,712,301; 6,874,719; and 7,628,348. A seal for the cap used to close off the unused connection port may rely on a shaped cap rather than a seal. See FIG. 7 of U.S. Pat. No. 6,874,719.

Even with properly designed seals, however, the frictional contact by each of the seals against the gear shaft adds resistance to the rotation of the gear system thereby reducing the performance of the reel's rotation.

It would be desirable to have a spinning reel with reduced friction against the master gear.

It would also be desirable to have a spinning reel seal system that could disengage at least one unneeded seal from contact with the master gear without compromising the water resistance of the reel.

SUMMARY OF THE INVENTION

It is an object of the invention to provide a spinning reel having reduced friction against the main gear shaft without compromising water resistance of the internal reel assembly.

It is also an object of the invention to provide a spinning reel that is useable by right or left-handed anglers with reduced internal friction without compromising the contaminant intrusion resistance of the reel.

In accordance with these and other objects of the invention that will become apparent from the description herein, a spinning reel according to the invention comprises:

a fishing reel main body, a handle connector that is rotatably supported within said reel main body and exhibiting a connection opening on a first side of the reel body and on a second side of the reel body, each opening being dimensioned to receive a handle assembly, a shaped seal disposed around said handle connector at each of said first side and said second side, said seals engaging and sealing said handle connector against contaminant intrusion, a handle assembly dimensioned to fit within the first connector opening on the first side of said handle connection shaft, a closure cap dimensioned to cover the second connector opening and engage the shaped seal at the second side and urge said seal away from contact with the handle connector.

The inner annular wall of the closure cap presses on the outwardly inclined portion of the elastomeric seal. This pressure exerts a rotation force that lifts the inwardly inclined portion of the seal away from contact with the handle connection shaft and thereby reduces the amount of friction thereon. The result is an enhanced operational efficiency of the reel and enhanced perception of a smooth reeling action.

DETAILED DESCRIPTION OF THE INVENTION

Fishing reels according to the present invention are preferably spinning reels that exhibit lateral connections for a handle assembly to accommodate the needs of right-handed, left-handed, and anglers who prefer to position the reel in a non-conventional manner. The fishing reel assemblies according to the invention continue to use frictional seals at each connection port but employ seals having a shape that allows the seal to angle radially inwardly to seal but rotate radially outwardly to disengage from sealing contact. The wall of a closure cap bearing the outside diameter threads that hold the cap on the reel body is used to engage an angled upper portion of the seal in a contact that applies a rotational pressure that urges the radially inward portion away from sealing contact with the handle connections thereby reducing the frictional forces on the rotation of the handle. A stationary seal in the closure cap engages the upstanding wall of the reel body that has the inside diameter threads that are engaged by the closure cap. This stationary seal protects the closed port against contaminant intrusion.

One skilled in this art will understand that the threaded connection between the closure cap and the reel body may use the opposite configuration of threads, i.e., the annular wall of the closure cap has threads on its inside diameter, and the reel body wall exhibits threads on its outside diameter. It should also be understood that the reel body wall and closure cap may use a twist-and-lock connection in which the closure cap wall disengages the seal from the handle connection shaft.

The attached figures are conveniently described with reference to the attached drawing figures. It should be understood that the same reference number is used to refer to the same parts of the device.

Figure 1:
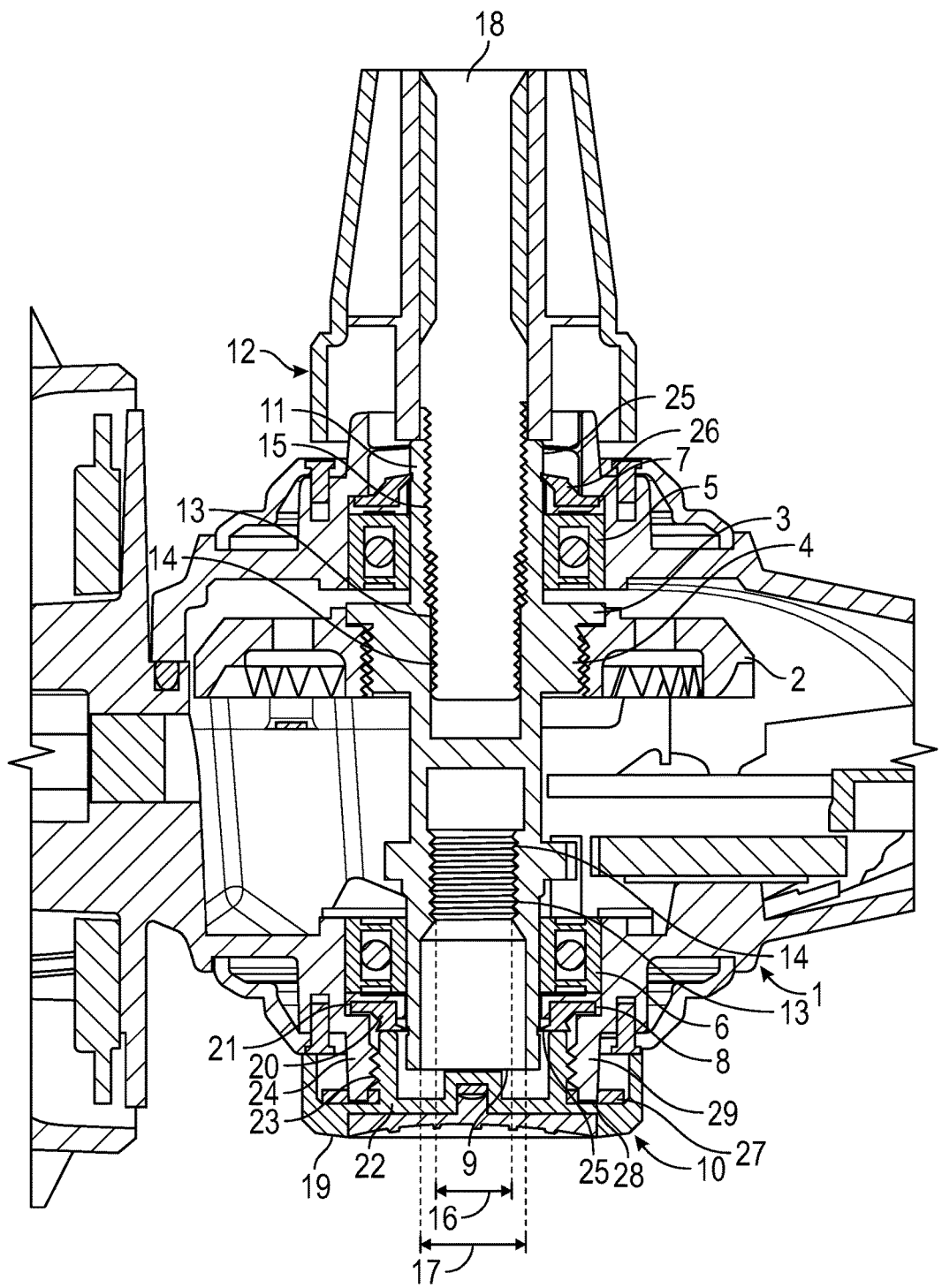
FIG. 1 is a view showing the handle and closure cap connections.
Figure 2:
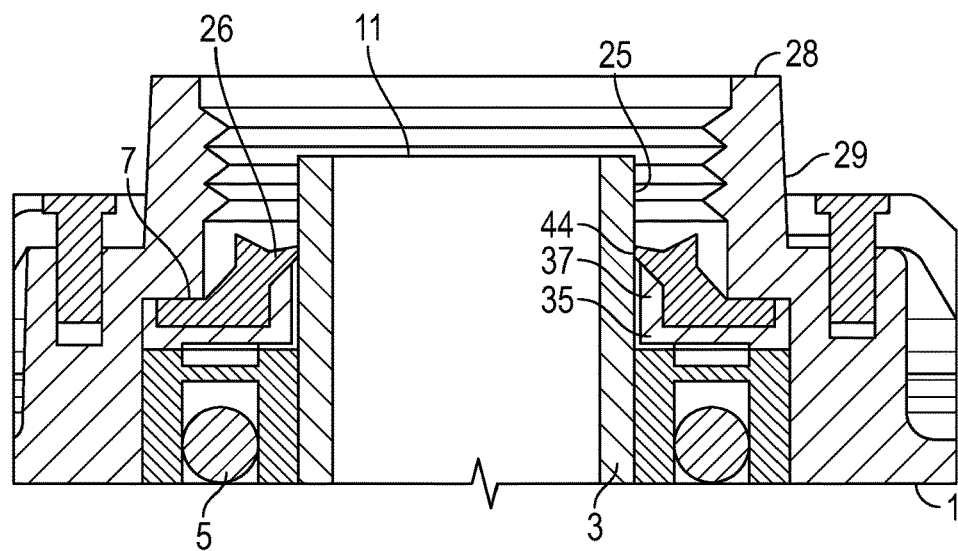
FIG. 2 is a view showing an engaged seal.
Figure 3:
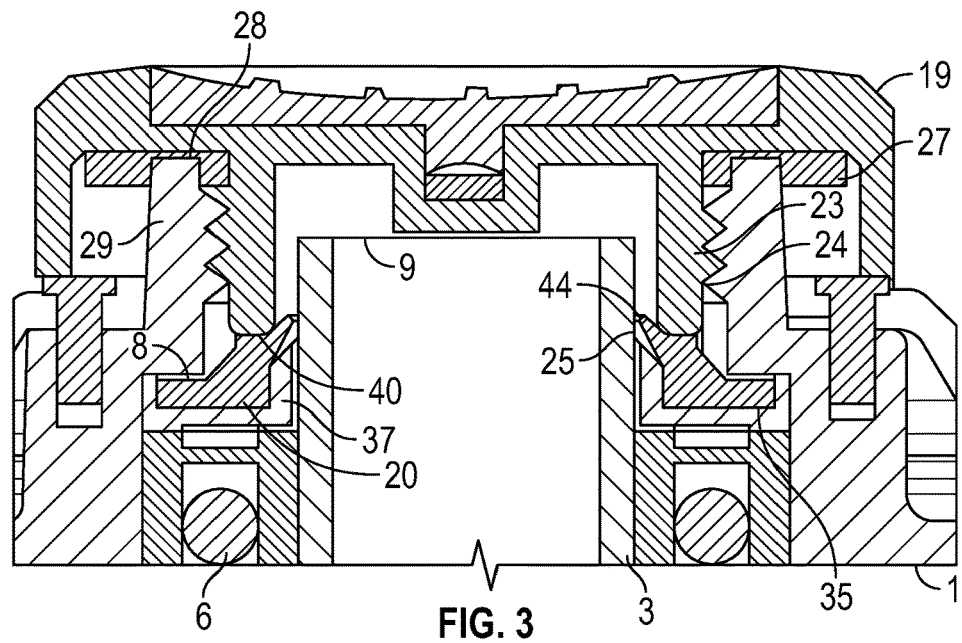
FIG. 3 is a view when the closure cap is used and the seal on that side is disengaged due to interaction with the cap.

As shown in FIGS. 1-3, reel body 1 houses master gear 2 that is coupled with tubular handle connector, such as handle connection shaft 3, at threaded gear connection 4. Handle connection shaft 3 is supported by bearings 5, 6 that are fit into shoulders 7, 8 in reel body 1. Handle connection shaft 3 has a first opening 9 on a first side 10 of reel body 1 as well as second opening 11 on second side 12 of reel body 1. Both openings 9, 11 preferably have connector shaft threads 13 formed on the inside of handle connection shaft 3 of at least central portion 14. Preferably, threads are formed at both central portion 14 as well as outer portion 15. Central portion 14 and outer portion 15 may exhibit the same or different inner diameters. Preferably central portion 14 has a smaller inner shaft diameter 16 than the inner shaft diameter 17 of outer portion 15. Handle assembly 18 (partial view shown) should exhibit corresponding mating threads and diameters to allow use of handle assembly 18 on either the first side 10 or the second side 12. Closure cap 19 is used to close off the side that is not used by handle assembly 18.

First disengageable seal 20 is used on first side 10 at shoulder 8 between bearing 6 and first abutment 21 and encircling handle connection shaft 3. Inner annular wall 22 of cap 19 exhibits cap threads 23 that coordinate with corresponding reel body threads 24 on an inside diameter of inner wall 22 of reel body 1. When cap 19 is screwed into connection with threads 23, inner annular wall 22 contacts an outwardly inclined surface of disengageable seal 20 and urges seal 20 radially away from and out of contact with the outside surface 25 of handle connection shaft 3. Second disengageable seal 26 remains in contact with the outside surface 25 of handle connection shaft 3. Stationary cap seal 27 is urged against the outer edge 28 of reel body wall 29, thereby sealing off first opening 9 from intrusion by environmental contaminants. Because reel body 29 does not rotate, cap seal 27 is effective to seal without adding rotational resistance to handle connection shaft 3.

The same effect occurs when handle assembly 18 is alternatively used in the first opening (e.g., the left side) and closure cap 19 covers the second opening (e.g., the right side). First disengageable seal 20 is engaged and second disengageable seal 26 will be disengaged with handle connection shaft 25 thereby reducing friction and minimizing rotational resistance of the reel.

Figure 4:
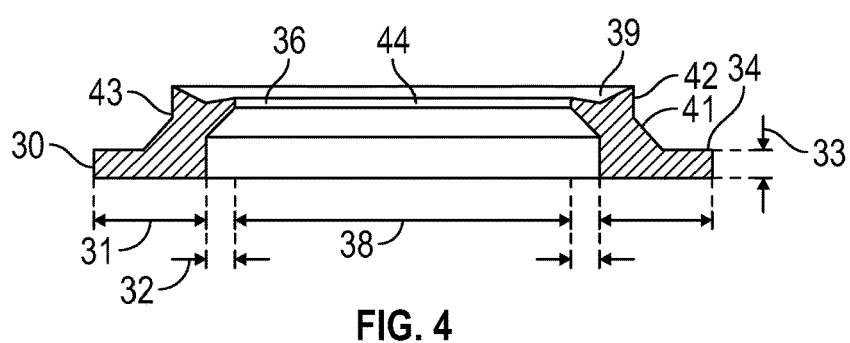
FIG. 4 shows a sectional view of a disengageable seal used in the invention.

FIG. 4 illustrates greater details of a disengageable seal, such as first disengageable seal 20 that is the same or substantially the same as second disengageable seal 26. It is convenient to describe the relationships among the preferred shapes by reference to lower (as a reference to that portion of the seal closest to the interior of the reel) and upper (denoting that portion of the seal that is closest to the outside of the reel).

Seal 20 preferably exhibits a cross sectional shape having a lower base portion 30. Base portion 30 has a first outside diameter 31 that is larger than first inside diameter 32 and an outer height 33 that extends upwardly to seal shoulder 34. Seal shoulder 34 is desirably of a sufficient length to hold seal 20 between bearing 6 and shoulder 8 in seal retention cavity 35.

The inside diameter 32 of seal 20 is greater than the outer diameter of handle connection shaft 3 as it is unnecessary to contact an extended length of seal 20 against the outside of handle connection shaft 3 to seal the area from contaminant intrusion. Additionally, an increased contact surface area will also unnecessarily increase the friction acting on handle connection shaft 3.

Instead, the upper portion of seal 20 exhibits an inwardly-inclined portion 36 that extends inwardly from inside diameter 32 towards the outside surface 25 of handle shaft connector 3. Inwardly inclined portion 36 exhibits a length sufficient to extend over the inner wall 37 of seal retention cavity 35 and into contact with the outside surface 25 of handle shaft connector 3. Inwardly inclined portion 36 thereby forms second inside diameter 38 of a length that is slightly smaller, e.g., 0.001-2 mm smaller, preferably 0.01-0.08 mm smaller than the diameter of outside surface 25 on handle shaft connection 3 for effective sealing contact.

Opposite inwardly inclined portion 36 is outwardly-inclined seal shoulder 39. The angle of inclination of seal shoulder 39 is generally within the range of 10-90 degrees, preferably 25-60 degrees, and most preferably 30-45 degrees from vertical, the specific angle chosen to coordinate with the profile of the leading edge 40 of inner annular wall 22 of closure cap 19 to rotate inwardly inclined portion 36 radially outwardly and away from contact with outside surface 25 of handle connection shaft 3. As shown, leading edge 40 is substantially flat although this profile can be rounded or angled to reduce wear on seal shoulder 30 as closure cap 19 is tightened to close opening 9.

Intermediate, inwardly-inclined, outside portion 41 of seal 20 connects outwardly-inclined seal shoulder 39 with the outside wall 42 of seal shoulder 39. Outside wall 42 is more vertical than outside portion 41 and forms flexure junction 43 where these portions meet. It will be understood that seal 20 is a molded seal of a relatively soft and flexible elastomeric material to provide the desired sealing effect so flexure junction 42 is a location rather than a joining is disparate parts. When leading edge 40 of inner annular wall 22 of cap 19 descends and contacts outwardly-inclined shoulder 39, continued progress of leading edge 40 urges shoulder 39 downwardly and in rotation about flexure junction 43 thereby rotating the inward face 44 of inward-reaching portion 36 out of contact with outside surface 25 of handle connection shaft 3 thereby reducing the rotational friction associated with such contact when performing a sealing function.

Figure 5:
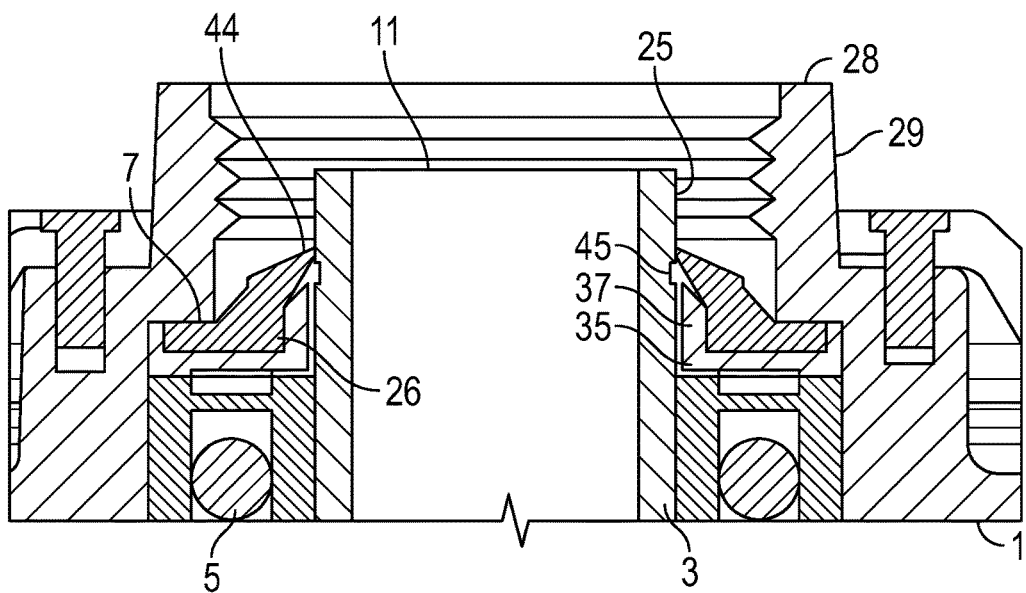
FIG. 5 shows an alternate embodiment with the seal in its resting position and engaged with the outside of the handle connection shaft.
Figure 6:
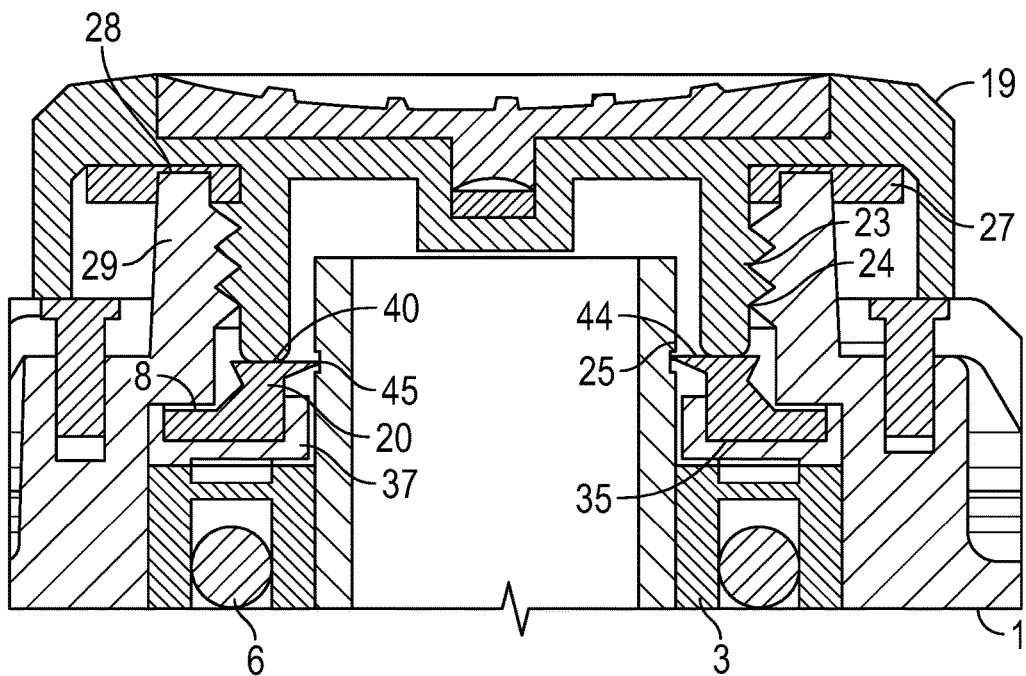
FIG. 6 shows the embodiment of FIG. 5 when the closure cap is used and the seal urged downwardly into the groove into its disengaged position.

FIGS. 5 and 6 illustrate an embodiment having groove 45 on the outside surface 25 at each end of the handle connection shaft 3 and below the normal contact location of the seal. It is noted that only one end is shown in FIGS. 5 and 6. In this embodiment, the leading edge 40 of inner annular wall 22 on closure cap 19 urges inward face 44 of seal 20 downwardly (using the perspective of the drawing) and into groove 45 thereby disengaging seal 20 from handle connection shaft 3. Groove 45

It should be understood that the preferred embodiments shown and illustrated in the attached figures are not intended to limit the scope of the claims.

Each of the patents disclosed or discussed herein are each incorporated by reference in their entireties.

What is claimed is:

1. A spinning reel used for fishing comprising:
   a fishing reel main body,
   a handle connector that is rotatably supported within said reel main body and exhibiting a connection opening on a first side of the reel body and on a second side of the reel body, each opening being dimensioned to receive a handle assembly,
   a shaped seal disposed around said handle connector at each of said first side and said second side, said seals engaging and sealing said handle connector against contaminant intrusion,
   said handle assembly dimensioned to fit within the first connector opening on the first side of said reel body, and
   a closure cap dimensioned to cover the second connector opening and engage the shaped seal at the second side and urge said seal out of contact with the handle connector.

2. A spinning reel according to claim 1 wherein said handle connector is a handle connection shaft having threaded connections at said handle connection openings on its first and second sides.

3. A spinning reel according to claim 2 wherein said closure cap engages the shaped seal and urges said seal into a groove in said handle connection shaft and out of contact with the handle connector.

4. A spinning reel according to claim 2 further comprising:
   a drive gear connected to said handle connection shaft, and
   a pinion gear extending in a direction transverse with the handle shaft and in geared communication with said drive gear, said pinion gear rotationally connected to a rotor at a front end of said reel and coaxially disposed with a spool shaft extending through said pinion gear and axially displaceable.

5. A spinning reel according to claim 1 wherein said reel body further comprises a retention cavity for each of the first and second seals.

6. A spinning reel according to claim 1 further comprising a support bearing on the first side of said reel body that rotationally supports said handle connector.

7. A spinning reel according to claim 1 wherein each of the first and second seals exhibits a first base portion, a radially-inwardly angled second portion dimensioned to contact said handle connector, and a radially-outwardly angled third portion.

8. A spinning reel according to claim 1 wherein said closure cap exhibits an annular channel extending from an inside, top surface of said cap, said annular channel being formed between (i) an outer wall and (ii) an inner wall having a length sufficient to engage a radially-outwardly angled third portion of the shaped seal and urge a radially-inwardly angled second portion of said seal away from contact with said handle connector when said closure cap is used to close the handle connector opening that is not used by the handle assembly.

9. A spinning reel according to claim 1 wherein said closure cap further comprises a compressible sealing member that engages a wall of said reel body around the second connector opening and thereby seals said second connector opening from contaminant intrusion.

10. A spinning reel according to claim 1 wherein said closure cap engages the shaped seal and urges said seal radially outwardly and out of contact with the handle connector.

11. A spinning reel used for fishing comprising:
    a fishing reel main body,
    a handle connection shaft that extends across said reel body from a first side to a second side of said reel main body and that is rotatably supported within said reel main body by a bearing support on said first side of said reel main body and on said second side of said reel main body, said handle connection shaft exhibiting a connection opening on each of said first side and said second side, each opening being dimensioned to receive a handle assembly,
    a shaped elastomeric seal disposed around said handle connection shaft at each of said first side and said second side, said seals engaging and sealing said handle connection shaft against contaminant intrusion,
    said handle assembly dimensioned to fit within the connection opening on the first side of said handle connection shaft, and
    a closure cap dimensioned to cover the second connection shaft opening and engage the shaped seal at the second side and urge said seal out of contact with the handle connection shaft.

12. A spinning reel according to claim 11 wherein said handle connection shaft has threaded connections at the handle connection openings on its first and second sides.

13. A spinning reel according to claim 11 wherein said reel body further comprises a retention cavity for each of the first and second seals.

14. A spinning reel according to claim 11 further comprising a support bearing on the first side of said reel body that rotationally supports said handle connection shaft.

15. A spinning reel according to claim 11 wherein each of the first and second shaped seals exhibits a first base portion, a radially-inwardly angled second portion dimensioned to contact said handle connection shaft, and a radially-outwardly angled third portion.

16. A spinning reel according to claim 15 wherein said closure cap exhibits an annular channel extending from an inside, top surface of said cap, said annular channel being formed between (i) an outer wall and (ii) an inner wall having a length sufficient to engage said radially-outwardly angled third portion of either one of the shaped seals and urge said radially-inwardly angled second portion of either one of said seals away from contact with said handle connection shaft when said closure cap is used to close the handle connector opening that is not used by the handle assembly.

17. A spinning reel according to claim 16 wherein said closure cap further comprises a compressible sealing member that engages a wall of said reel body around the second opening and thereby seals said second opening from contaminant intrusion.

18. A spinning reel according to claim 11 wherein said closure cap engages the shaped seal at the connection opening on the second side of the reel main body and urges said seal radially outwardly and out of contact with the handle connection shaft.

19. A spinning reel according to claim 11 wherein said closure cap engages the shaped seal at the connection opening on the second side of the reel main body and urges said seal into a groove in said handle connection shaft and out of contact with the handle connection shaft.

20. A spinning reel comprising:
(a) a fishing reel main body,
(b) a handle connection shaft that extends across said reel body from a first side to a second side of said reel main body and that is rotatably supported within said reel main body by a bearing support on said first side of said reel main body and on said second side of said reel main body, said handle connection shaft exhibiting an opening on each of said first side and said second side that is dimensioned to receive a handle assembly,
(c) said handle assembly dimensioned to fit within each opening on the first side and the second side,
(d) a drive gear connected to said handle connection shaft,
(e) a pinion gear extending in a direction transverse with the handle shaft and in geared communication with said drive gear, said pinion gear rotationally connected to a rotor at a front end of said reel and coaxially disposed with a spool shaft extending through said pinion gear and axially displaceable,
(f) a shaped elastomeric seal disposed around said handle connection shaft at each of said first side and said second side and between the bearing support and the opening at each side, said seal exhibiting a first base portion of largest diameter, a radially-inwardly angled second portion dimensioned to contact an outer diameter of said handle connection shaft, and a radially-outwardly angled third portion, and
(g) a closure cap exhibiting an annular channel extending from an inside, top surface of said cap, said channel comprising (i) an outer wall and (ii) an inner wall having a length sufficient to engage said radially-outwardly angled third portion of the shaped seal and urge said radially-inwardly angled second portion of said seal out of contact with said handle connection shaft when said closure cap is used to close the handle connection shaft opening that is not used by the handle assembly.

* * * * *